US008676187B2

(12) United States Patent
Ionescu et al.

(10) Patent No.: US 8,676,187 B2
(45) Date of Patent: Mar. 18, 2014

(54) DYNAMIC BINDING OF SERVICE ON BEARER

(75) Inventors: Alexandru Catalin Ionescu, Issaquah, WA (US); Giridhar Sreenivas, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 13/369,251

(22) Filed: Feb. 8, 2012

(65) Prior Publication Data

US 2012/0315889 A1 Dec. 13, 2012

Related U.S. Application Data

(60) Provisional application No. 61/440,836, filed on Feb. 8, 2011.

(51) Int. Cl.
*H04W 4/00* (2009.01)
*H04W 88/02* (2009.01)
*H04W 4/02* (2009.01)
*H04W 88/06* (2009.01)

(52) U.S. Cl.
CPC ............. *H04W 88/02* (2013.01); *H04W 4/02* (2013.01); *H04W 88/06* (2013.01)
USPC ........ 455/422.1; 380/233; 380/277; 700/297; 705/400; 705/80; 705/54; 705/37; 705/30; 713/164; 713/176; 713/187; 713/189; 713/155; 726/1; 726/26; 726/27

(58) Field of Classification Search
USPC ............... 455/422.1; 713/157, 155, 164, 176, 713/189, 193; 726/3, 12, 26, 27, 1; 705/1, 705/7, 8, 10, 11, 14, 22, 26, 28, 30, 37, 51, 705/400, 80, 54; 380/233, 277; 700/297
See application file for complete search history.

(56) References Cited

U.S. PATENT DOCUMENTS 5,892,900 A * 4/1999 Ginter et al. ............ 726/26
5,910,987 A * 6/1999 Ginter et al. ............ 705/52
(Continued)

FOREIGN PATENT DOCUMENTS

| EP | 2252115 A1 | 11/2010 |
| EP | 2252118 A1 | 11/2010 |

OTHER PUBLICATIONS

International Searching Authority, International Search Report and Written Opinion, PCT Application PCT/US2012/024375, mailed May 30, 2012, 9 pages.

*Primary Examiner* — William D Cumming
(74) *Attorney, Agent, or Firm* — Perkins Coie LLP (57) ABSTRACT

Methods that facilitate automatic selection of service bearers in a mobile based on user-initiated policies and service-provider-initiated policies set forth in a policy document are described herein. The mobile device initially receives a policy document from either the mobile device manufacturer or the service provider before the mobile device is provisioned on a communications network. The mobile device user and the service provider may make subsequent changes to the policy document. When a user-initiated policy change conflicts with a service-provider-initiated policy, the user-initiated policy change is disregarded in favor of the service-provider-initiated policy. The mobile device automatically selects an appropriate bearer based at least on the availability of service bearers in the current environment and the policies set forth in the policy document.

20 Claims, 7 Drawing Sheets

(56) References Cited

U.S. PATENT DOCUMENTS

| | | | |
|---|---|---|---|
| 5,915,019 A * | 6/1999 | Ginter et al. | 705/54 |
| 5,917,912 A * | 6/1999 | Ginter et al. | 713/187 |
| 5,949,876 A * | 9/1999 | Ginter et al. | 705/80 |
| 5,982,891 A * | 11/1999 | Ginter et al. | 705/54 |
| 6,237,786 B1 * | 5/2001 | Ginter et al. | 213/153 |
| 6,253,193 B1 * | 6/2001 | Ginter et al. | 705/57 |
| 6,363,488 B1 * | 3/2002 | Ginter et al. | 726/1 |
| 6,389,402 B1 * | 5/2002 | Ginter et al. | 705/51 |
| 6,427,140 B1 * | 7/2002 | Ginter et al. | 705/80 |
| 6,640,304 B2 * | 10/2003 | Ginter et al. | 713/193 |
| 6,948,070 B1 * | 9/2005 | Ginter et al. | 713/193 |
| 6,954,736 B2 * | 10/2005 | Menninger et al. | 705/28 |
| 7,039,606 B2 * | 5/2006 | Hoffman et al. | 705/80 |
| 7,051,212 B2 * | 5/2006 | Ginter et al. | 713/193 |
| 7,054,837 B2 * | 5/2006 | Hoffman et al. | 705/28 |
| 7,069,451 B1 * | 6/2006 | Ginter et al. | 705/51 |
| 7,072,843 B2 * | 7/2006 | Menninger et al. | 705/7.31 |
| 7,095,854 B1 * | 8/2006 | Ginter et al. | 380/233 |
| 7,100,199 B2 * | 8/2006 | Ginter et al. | 726/4 |
| 7,120,596 B2 * | 10/2006 | Hoffman et al. | 705/28 |
| 7,120,800 B2 * | 10/2006 | Ginter et al. | 713/193 |
| 7,124,302 B2 * | 10/2006 | Ginter et al. | 713/189 |
| 7,133,845 B1 * | 11/2006 | Ginter et al. | 705/51 |
| 7,171,379 B2 * | 1/2007 | Menninger et al. | 705/28 |
| 7,546,257 B2 * | 6/2009 | Hoffman et al. | 705/28 |
| 7,752,466 B2 * | 7/2010 | Ginter et al. | 713/194 |
| 7,831,823 B2 * | 11/2010 | Ginter et al. | 713/155 |
| 7,844,835 B2 * | 11/2010 | Ginter et al. | 713/193 |
| 7,917,749 B2 * | 3/2011 | Ginter et al. | 713/164 |
| 7,984,509 B2 * | 7/2011 | Ginter et al. | 726/27 |
| 8,006,087 B2 * | 8/2011 | Ginter et al. | 713/164 |
| 8,055,913 B2 * | 11/2011 | Ginter et al. | 713/194 |
| 8,112,625 B2 * | 2/2012 | Ginter et al. | 713/164 |
| 8,141,165 B2 * | 3/2012 | Ginter et al. | 726/27 |
| 8,181,021 B2 * | 5/2012 | Ginter et al. | 713/164 |
| 8,191,157 B2 * | 5/2012 | Ginter et al. | 726/27 |
| 8,191,158 B2 * | 5/2012 | Ginter et al. | 726/27 |
| 8,291,238 B2 * | 10/2012 | Ginter et al. | 713/189 |
| 8,316,449 B2 * | 11/2012 | Ginter et al. | 726/26 |
| 2002/0048369 A1 | 4/2002 | Ginter et al. | 380/277 |
| 2003/0018513 A1 * | 1/2003 | Hoffman et al. | 705/10 |
| 2003/0028412 A1 * | 2/2003 | Hoffman et al. | 705/10 |
| 2003/0040986 A1 * | 2/2003 | Hoffman et al. | 705/28 |
| 2003/0041001 A1 * | 2/2003 | Hoffman et al. | 705/37 |
| 2003/0046089 A1 * | 3/2003 | Menninger et al. | 705/1 |
| 2003/0046120 A1 * | 3/2003 | Hoffman et al. | 705/7 |
| 2003/0046121 A1 * | 3/2003 | Menninger et al. | 705/7 |
| 2003/0046136 A1 * | 3/2003 | Hoffman et al. | 705/10 |
| 2003/0046190 A1 * | 3/2003 | Hoffman et al. | 705/28 |
| 2003/0046214 A1 * | 3/2003 | Menninger | 705/37 |
| 2003/0048301 A1 * | 3/2003 | Menninger | 345/764 |
| 2003/0050807 A1 * | 3/2003 | Hoffman et al. | 705/7 |
| 2003/0050808 A1 * | 3/2003 | Mor | 705/7 |
| 2003/0050809 A1 * | 3/2003 | Hoffman et al. | 705/7 |
| 2003/0050822 A1 * | 3/2003 | Hoffman et al. | 705/10 |
| 2003/0050823 A1 * | 3/2003 | Gehman et al. | 705/10 |
| 2003/0050828 A1 * | 3/2003 | Hoffman et al. | 705/11 |
| 2003/0050845 A1 * | 3/2003 | Hoffman et al. | 705/26 |
| 2003/0050859 A1 * | 3/2003 | Rodriguez et al. | 705/27 |
| 2003/0050867 A1 * | 3/2003 | Menninger et al. | 705/28 |
| 2003/0050868 A1 * | 3/2003 | Hoffman et al. | 705/28 |
| 2003/0055692 A1 * | 3/2003 | Menninger | 705/7 |
| 2003/0055693 A1 * | 3/2003 | Hoffman et al. | 705/7 |
| 2003/0055694 A1 * | 3/2003 | Menninger | 705/7 |
| 2003/0055700 A1 * | 3/2003 | Hoffman et al. | 705/8 |
| 2003/0055704 A1 * | 3/2003 | Reece | 705/9 |
| 2003/0055708 A1 * | 3/2003 | Hoffman et al. | 705/10 |
| 2003/0055709 A1 * | 3/2003 | Hoffman et al. | 705/10 |
| 2003/0055710 A1 * | 3/2003 | Burk et al. | 705/10 |
| 2003/0055731 A1 * | 3/2003 | Fouraker et al. | 705/22 |
| 2003/0055734 A1 * | 3/2003 | Hoffman et al. | 705/26 |
| 2003/0055750 A1 * | 3/2003 | Menninger | 705/28 |
| 2003/0061084 A1 * | 3/2003 | Menninger | 705/8 |
| 2003/0061102 A1 * | 3/2003 | Menninger et al. | 705/22 |
| 2003/0061124 A1 * | 3/2003 | Menninger et al. | 705/28 |
| 2003/0061125 A1 * | 3/2003 | Hoffman et al. | 705/28 |
| 2003/0061130 A1 * | 3/2003 | Hoffman et al. | 705/30 |
| 2003/0061174 A1 * | 3/2003 | Menninger | 705/400 |
| 2003/0065541 A1 * | 4/2003 | Menninger | 705/7 |
| 2003/0065549 A1 * | 4/2003 | Hoffman et al. | 705/10 |
| 2003/0065550 A1 * | 4/2003 | Hoffman et al. | 705/10 |
| 2003/0065551 A1 * | 4/2003 | Hoffman et al. | 705/10 |
| 2003/0065557 A1 * | 4/2003 | Hoffman et al. | 705/14 |
| 2003/0065627 A1 * | 4/2003 | Menninger | 705/400 |
| 2003/0066886 A1 * | 4/2003 | Hoffman et al. | 235/385 |
| 2003/0069765 A1 * | 4/2003 | Menninger | 705/7 |
| 2003/0069766 A1 * | 4/2003 | Hoffman et al. | 705/7 |
| 2003/0069767 A1 * | 4/2003 | Menninger | 705/7 |
| 2003/0069768 A1 * | 4/2003 | Hoffman et al. | 705/7 |
| 2003/0069769 A1 * | 4/2003 | Hoffman et al. | 705/7 |
| 2003/0069770 A1 * | 4/2003 | Burk et al. | 705/7 |
| 2003/0069771 A1 * | 4/2003 | Menninger et al. | 705/7 |
| 2003/0069774 A1 * | 4/2003 | Hoffman et al. | 705/8 |
| 2003/0069778 A1 * | 4/2003 | Menninger et al. | 705/10 |
| 2003/0069779 A1 * | 4/2003 | Menninger et al. | 705/10 |
| 2003/0069786 A1 * | 4/2003 | Hoffman et al. | 705/14 |
| 2003/0069791 A1 * | 4/2003 | Menninger | 705/15 |
| 2003/0069794 A1 * | 4/2003 | Hoffman et al. | 705/22 |
| 2003/0069798 A1 * | 4/2003 | Hoffman | 705/26 |
| 2003/0069799 A1 * | 4/2003 | Hoffman et al. | 705/26 |
| 2003/0069813 A1 * | 4/2003 | Burk | 705/28 |
| 2003/0069814 A1 * | 4/2003 | Hoffman et al. | 705/28 |
| 2003/0069818 A1 * | 4/2003 | Menninger | 705/35 |
| 2003/0069823 A1 * | 4/2003 | Hoffman et al. | 705/37 |
| 2003/0069824 A1 * | 4/2003 | Menninger | 705/37 |
| 2003/0069825 A1 * | 4/2003 | Hoffman et al. | 705/37 |
| 2003/0069859 A1 * | 4/2003 | Hoffman et al. | 705/400 |
| 2003/0074205 A1 * | 4/2003 | Menninger | 705/1 |
| 2003/0074206 A1 * | 4/2003 | Hoffman et al. | 705/1 |
| 2003/0074237 A1 * | 4/2003 | Sechrist et al. | 705/7 |
| 2003/0074238 A1 * | 4/2003 | Hoffman et al. | 705/7 |
| 2003/0074239 A1 * | 4/2003 | Hoffman et al. | 705/7 |
| 2003/0074249 A1 * | 4/2003 | Hoffman et al. | 705/10 |
| 2003/0074250 A1 * | 4/2003 | Burk | 705/10 |
| 2003/0074262 A1 * | 4/2003 | Hoffman et al. | 705/26 |
| 2003/0074263 A1 * | 4/2003 | Hoffman et al. | 705/26 |
| 2003/0074264 A1 * | 4/2003 | Hoffman | 705/26 |
| 2003/0074281 A1 * | 4/2003 | Hoffman et al. | 705/28 |
| 2003/0074285 A1 * | 4/2003 | Hoffman et al. | 705/30 |
| 2003/0074355 A1 * | 4/2003 | Menninger et al. | 707/9 |
| 2003/0078787 A1 * | 4/2003 | Hoffman et al. | 705/1 |
| 2003/0078818 A1 * | 4/2003 | Hoffman et al. | 705/7 |
| 2003/0078819 A1 * | 4/2003 | Hoffman et al. | 705/7 |
| 2003/0078827 A1 * | 4/2003 | Hoffman | 705/10 |
| 2003/0078845 A1 * | 4/2003 | Hoffman et al. | 705/22 |
| 2003/0078846 A1 * | 4/2003 | Burk et al. | 705/22 |
| 2003/0078860 A1 * | 4/2003 | Hoffman et al. | 705/28 |
| 2003/0078861 A1 * | 4/2003 | Hoffman et al. | 705/28 |
| 2003/0083909 A1 * | 5/2003 | Hoffman et al. | 705/7 |
| 2003/0083918 A1 * | 5/2003 | Hoffman et al. | 705/8 |
| 2003/0083947 A1 * | 5/2003 | Hoffman et al. | 705/22 |
| 2003/0088449 A1 * | 5/2003 | Menninger | 705/8 |
| 2003/0088474 A1 * | 5/2003 | Hoffman et al. | 705/26 |
| 2003/0088784 A1 * | 5/2003 | Ginter et al. | 713/189 |
| 2003/0097317 A1 * | 5/2003 | Burk et al. | 705/30 |
| 2003/0105721 A1 * | 6/2003 | Ginter et al. | 705/54 |
| 2003/0163431 A1 * | 8/2003 | Ginter et al. | 705/64 |
| 2003/0191719 A1 * | 10/2003 | Ginter et al. | 705/54 |
| 2004/0054630 A1 * | 3/2004 | Ginter et al. | 705/53 |
| 2004/0103305 A1 * | 5/2004 | Ginter et al. | 713/200 |
| 2004/0133793 A1 * | 7/2004 | Ginter et al. | 713/193 |
| 2004/0193482 A1 * | 9/2004 | Hoffman et al. | 705/14 |
| 2005/0060245 A1 * | 3/2005 | Hoffman et al. | 705/28 |
| 2005/0177716 A1 * | 8/2005 | Ginter et al. | 713/157 |
| 2006/0015416 A1 * | 1/2006 | Hoffman et al. | 705/28 |
| 2006/0069926 A1 * | 3/2006 | Ginter et al. | 713/194 |
| 2006/0174326 A1 * | 8/2006 | Ginter et al. | 726/3 |
| 2006/0212722 A1 * | 9/2006 | Ginter et al. | 713/193 |
| 2006/0224903 A1 * | 10/2006 | Ginter et al. | 713/193 |
| 2007/0061594 A1 * | 3/2007 | Ginter et al. | 713/189 |
| 2007/0064943 A1 * | 3/2007 | Ginter et al. | 380/233 |
| 2007/0226807 A1 * | 9/2007 | Ginter et al. | 726/27 |
| 2007/0234069 A1 * | 10/2007 | Ginter et al. | 713/189 |
| 2007/0245403 A1 * | 10/2007 | Ginter et al. | 726/2 |

(56) References Cited

U.S. PATENT DOCUMENTS

| | | | |
|---|---|---|---|
| 2007/0250937 A1* | 10/2007 | Ginter et al. | 726/27 |
| 2007/0261125 A1* | 11/2007 | Ginter et al. | 726/27 |
| 2007/0266429 A1* | 11/2007 | Ginter et al. | 726/12 |
| 2007/0277031 A1* | 11/2007 | Ginter et al. | 713/155 |
| 2008/0022137 A1* | 1/2008 | Ginter et al. | 713/194 |
| 2008/0034227 A1* | 2/2008 | Ginter et al. | 713/194 |
| 2008/0034230 A1* | 2/2008 | Ginter et al. | 713/194 |
| 2008/0034231 A1* | 2/2008 | Ginter et al. | 713/194 |
| 2008/0034406 A1* | 2/2008 | Ginter et al. | 726/2 |
| 2008/0052541 A1* | 2/2008 | Ginter et al. | 713/194 |
| 2008/0126798 A1* | 5/2008 | Ginter et al. | 713/164 |
| 2008/0126803 A1* | 5/2008 | Ginter et al. | 713/168 |
| 2008/0127304 A1* | 5/2008 | Ginter et al. | 726/2 |
| 2008/0148056 A1* | 6/2008 | Ginter et al. | 713/176 |
| 2009/0043652 A1* | 2/2009 | Ginter et al. | 705/14 |
| 2009/0048978 A1* | 2/2009 | Ginter et al. | 705/51 |
| 2009/0132805 A1* | 5/2009 | Ginter et al. | 713/150 |
| 2009/0132815 A1* | 5/2009 | Ginter et al. | 713/164 |
| 2010/0124920 A1 | 5/2010 | Feher | |
| 2010/0228996 A1* | 9/2010 | Ginter et al. | 713/189 |
| 2010/0250935 A1* | 9/2010 | Ginter et al. | 713/168 |
| 2010/0257614 A1* | 10/2010 | Ginter et al. | 726/28 |
| 2010/0275040 A1* | 10/2010 | Ginter et al. | 713/194 |
| 2010/0313013 A1* | 12/2010 | Ginter et al. | 713/155 |
| 2011/0022520 A1* | 1/2011 | Ginter et al. | 705/51 |
| 2011/0022846 A1* | 1/2011 | Ginter et al. | 713/176 |
| 2011/0145602 A1* | 6/2011 | Ginter et al. | 713/193 |
| 2011/0173695 A1* | 7/2011 | Ginter et al. | 726/21 |
| 2011/0197285 A1* | 8/2011 | Ginter et al. | 726/27 |
| 2011/0288692 A1* | 11/2011 | Scott | 700/297 |
| 2012/0315889 A1* | 12/2012 | Ionescu et al. | 455/422.1 |

\* cited by examiner

```
<IMSRegistrationPolicy>

<NetworkType>EDGE,GPRS</NetworkType>
            <MobileNetwork>ON</MobileNetwork>
            <IMSRegistration>OFF</IMSRegistration>
            <Priority>04</Priority>
            <ServicePlan>Economy</ServicePlan>
            <CongestionAvoid>OFF</CongestionAvoid>
            <UserApplication>TEXT,PHONE,EMAIL</UserApplication>
            <UserModify>OFF</UserModify>

<NetworkType>UMTS</NetworkType>
            <MobileNetwork>ON</MobileNetwork>
            <IMSRegistration>ON</IMSRegistration>
            <Service>+g.3gpp.smsip</Service>
            <Priority>03</Priority>
            <ServicePlan>Economy,Standard</ServicePlan>
            <CongestionAvoid>OFF</CongestionAvoid>
            <UserApplication>TEXT,PHONE,EMAIL</UserApplication>
            <UserModify>OFF</UserModify>

<NetworkType>HSPA</NetworkType>
            <MobileNetwork>ON</MobileNetwork>
            <IMSRegistration>ON</IMSRegistration>
            <Service>+g.3gpp.smsip</Service>
            <Priority>02</Priority>
            <ServicePlan>Economy,Standard,Premium</ServicePlan>
            <CongestionAvoid>ON</CongestionAvoid>
            <UserApplication>TEXT,PHONE,VIDEOCHAT,EMAIL</UserApplication>
            <UserModify>OFF</UserModify>

<NetworkType>IEEE-802.3</NetworkType>
            <MobileNetwork>OFF</MobileNetwork>
            <IMSRegistration>ON</IMSRegistration>
            <Service>+g.3gpp.smsip</Service>
            <Service>urn-7:3gpp-service.ims.icsi.mmtel</Service>
            <Priority>01</Priority>
            <ServicePlan>Economy,Standard,Premium</ServicePlan>
            <CongestionAvoid>OFF</CongestionAvoid>
            <UserApplication>TEXT,PHONE,VIDEOCHAT,EMAIL</UserApplication>
            <UserModify>ON</UserModify>

</IMSRegistrationPolicy>
```

FIG. 5

DYNAMIC BINDING OF SERVICE ON BEARER

CROSS-REFERENCE TO RELATED APPLICATION(S)

This application claims the priority of U.S. Provisional Application No. 61/440,836, entitled DYNAMIC BINDING OF SERVICE ON BEARER, filed Feb. 8, 2011, the entirety of which is hereby incorporated by reference.

BACKGROUND

Users of mobile devices (such as mobile phones, personal digital assistants, computer tablets, or the like) routinely encounter network environments in which the mobile device is capable of sending and receiving data over two or more distinct available networks (or "service bearers"). For example, the mobile device may be capable of accessing a network under macro coverage, such as Global System for Mobile/Universal Mobile Telecommunications System (GSM/UMTS), while simultaneously being capable of accessing a network under WiFi coverage. In such situations, it is desirable for the mobile device to choose the appropriate bearer based on a variety of factors determined by the service provider and by the user of the mobile device.

In current systems, the mobile device typically monitors available bearers manually such that a bearer change occurs only when the user makes a conscious decision to switch from a current bearer to a new bearer. This current process of user-initiated bearer selection often results in inefficient use of available network resources. For example, a user who desires to download a large file may initially perform a check to determine which service bearers are available. Upon performing the check, the user may determine that only one service bearer is currently available, such as a Third Generation (3G) telecommunications network. In the current example, the user must download the file over the 3G network because no other service bearers are available for selection. However, moments later, a WiFi network that was previously unavailable now becomes available. The new availability of the WiFi network could result from the user physically moving in range of the WiFi network that was previously out of range, or the new availability may result from a WiFi network being brought online from an offline state.

In either instance, once the WiFi network is available, current mobile devices maintain the slower connection to the 3G network that the user previously selected. The mobile device does not automatically switch from the slower 3G network to the faster WiFi network until the user first notices that the WiFi network is now available and then manually switches the mobile device from the 3G network to the WiFi network. Commonly, a significant amount of time may elapse before the user notices the availability of a faster network because the user typically does not actively monitor the status of the mobile device, particularly when waiting for a large file to download. Therefore, inefficiency results when a mobile device remains on a slower network when a faster network is available.

In present systems, similar inefficiencies may occur from the perspective of the telecommunications service provider. For example, if a mobile service subscriber opts to pay for a middle tier service plan, the service provider may desire to place that subscriber's mobile device on a slower network (such as 3G), if available, rather than allowing the subscriber to consume resources on the service provider's premium network (such as a Fourth Generation (4G) telecommunications network). If a middle tier subscriber powers on his or her mobile device in an area having only a premium network (such as 4G) available, current systems may enable the middle tier subscriber to remain on the premium network even after the subscriber enters an area where a non-premium network (such as 3G) is available in addition to the 4G network. From the service provider's perspective, this would result in an inefficient use of system resources because the middle tier subscriber would continue to consume resources intended for subscribers who have opted to pay an increased fee for access to the service provider's premium network.

BRIEF DESCRIPTION OF THE DRAWINGS

FIG. 2 is a diagram depicting a sample policy document implemented in XML format.

DETAILED DESCRIPTION

Figure 1A:
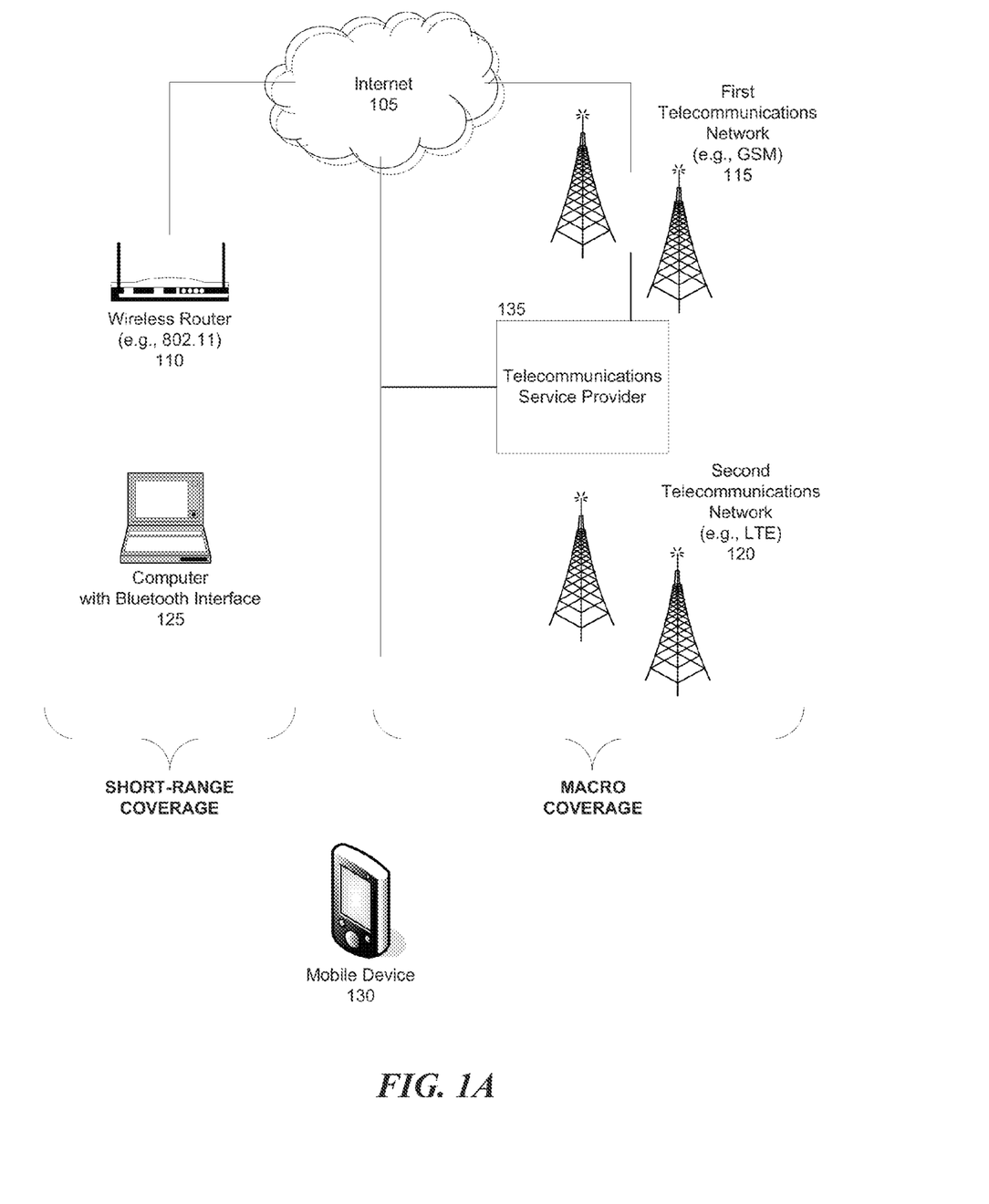
FIG. 1A is a representation of a typical environment encountered by a mobile device.

FIG. 1A is a representation of a typical environment 100 encountered by a mobile device, such as mobile device 130. Environment 100 includes both short-range coverage and macro coverage. Examples of short-range coverage may include WiFi, Ultra-wideband, ZIGBEE, and infrared networks. Those skilled in the art will appreciate that short-range coverage may include numerous additional types of networks. As illustrated in FIG. 1A, portable device 130 may connect to Internet 105 by establishing a WiFi connection through wireless router 110. Similarly, mobile device 130 may connect to computer 125 via a BLUETOOTH connection.

Examples of macro coverage networks may include third-party telecommunications networks such as a Global System for Mobile (GSM) mobile telecommunications network and a Third or Fourth generation (3G/4G) mobile telecommunications network (e.g., General Packet Radio Service/Enhanced General Packet Radio Service (GPRS/EGPRS), Enhanced Data rates for GSM Evolution (EDGE), Universal Mobile Telecommunications System (UMTS), and Long Term Evolution (LTE) network). Those skilled in the art will appreciate that macro coverage may include numerous additional types of networks.

As illustrated in FIG. 1A, mobile device 130 may connect to first telecommunications network 115 and second telecommunications network 120 via one or more transceivers (not shown) internal to the mobile device. First telecommunications network 115 and second telecommunications network 120 may be of the same type (e.g., both EDGE networks) or different types (e.g., one GSM network and one LTE network). First telecommunications network 115 and second telecommunications network 120 may be connected to Internet 105 and controlled by telecommunications service provider 135. In the disclosed system, telecommunications service provider 135 may remotely monitor and manage policies on the mobile device, including remotely providing updates to the policies on the mobile device on a periodic basis. Furthermore, the telecommunications service provider may remotely request a list of user-initiated updates made to the policy document and remotely initiate changes to the policy document based on the received list of user-initiated updates.

In the disclosed system, when mobile device 130 is placed in an environment with two or more available bearers, the device automatically selects the appropriate bearer based on a policy that governs bearer selection. The service provider may set the policies and provide the policies to the mobile device before provisioning the device on the service provider's network. As described herein, these policies may be provided in the form of a policy document. Alternatively, the service provider may provide the policies to the manufacturer of the mobile device, and the manufacturer may then provide the policies to the mobile device before the user receives the device. In some embodiments, the system may be implemented in an Android environment.

The service provider and, in certain instances, the mobile device user may modify the initial policies that the service provider established. For example, the service provider may modify the policies according to the mobile device user's chosen service plan or according to changes on the service provider's network. Similarly, the user may be allowed to change the initial policies based on, for example, the particular purpose for which the user intends to access the service provider's network (such as for texting only or for video chatting). Certain service-provider policies may be changed by the mobile device user, and certain other policies may not be changed by the mobile device user. If a conflict arises between a service provider policy and a policy set by the mobile device user, the conflict may be resolved in favor of the service provider.

For example, the service provider may specify a policy that the mobile device must use WiFi, if available, to carry traffic related to streaming video—regardless of whether the mobile device is capable of streaming the same video data over an available 3G or 4G network. The user subsequently requests a policy change that would dictate that the mobile device should not join a WiFi network with a low or medium signal strength (as opposed to a high signal strength) if a 3G or 4G network is available. A conflict would then arise if the mobile device enters an environment in which a 3G network is available, a 4G network is available, and a WiFi network is available with a low signal strength. The user policy would dictate that the mobile device join the 3G or 4G network, but the service provider policy would dictate that the mobile device join the WiFi network. In this situation, the conflict would be resolved in favor of the service provider, resulting in the device streaming video over the WiFi network. Even though the user requested a policy that the mobile device should not connect to the WiFi network because of its low signal strength, the service provider policy would defeat the user-requested policy.

A policy may contain multiple segments of information to enable the mobile device to select the appropriate bearer. For example, the policy may set rules based not only on the available bearers, but also based on the bearer to which the mobile device is currently connected. The policy may set rules based on whether the mobile device must be attached to the mobile network in order to select a particular bearer. The policy may set rules based on whether IP for Multimedia System (IMS) registration is needed when the mobile device is attached to a given network. The policy may specify one or more feature tags that may be registered or must be registered when connecting to a given network. The policy may specify a priority associated with a given network. For example, if multiple bearers are otherwise equally appropriate for selection, the bearer with the highest priority may be selected over the bearers with a lower priority. The policy may specify certain bearers that are or are not available based on the service plan selected by the mobile device user. The policy may specify whether the mobile device should avoid a particular bearer if that bearer is congested with network traffic. The policy may specify one or more appropriate bearers based on the services that the mobile device uses. For example, the policy may specify that video chat data must be transferred over a WiFi network if such a network is available. The policy may specify whether a user may modify the policy. Or, as a further example, the policy may specify that large files may not be downloaded over an EDGE network. A person of ordinary skill in the art will appreciate that numerous other information segments may be set forth in the bearer selection policy. A person of ordinary skill in the art further will appreciate that the policy may set forth certain available information segments while omitting certain other available information segments.

Figure 1B:
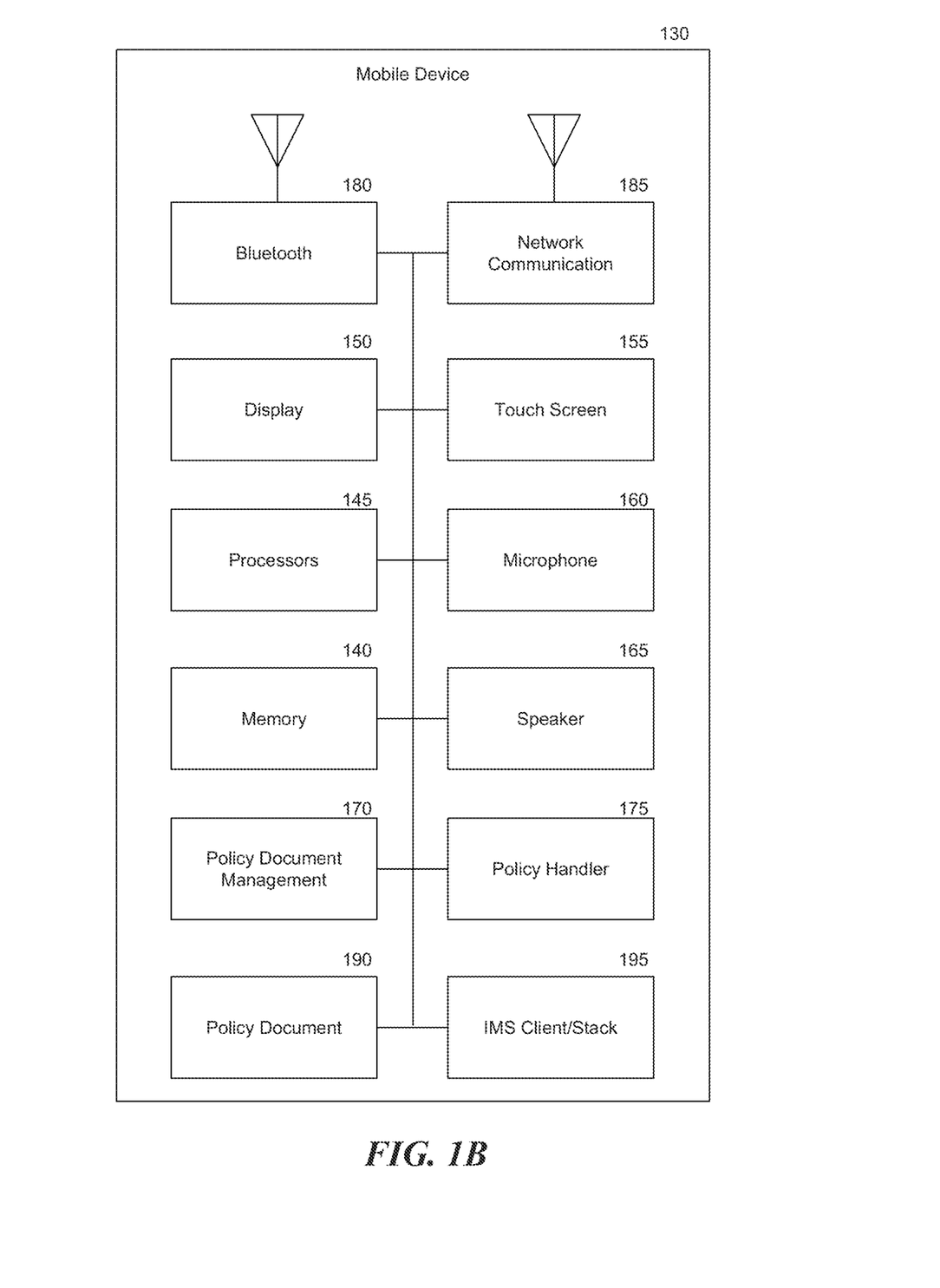
FIG. 1B is a block diagram of components in a mobile device.

FIG. 1B is a block diagram of various components in a mobile device 130 (such as a mobile phone, tablet computer, mobile media device, mobile gaming device, etc.). The mobile device 130 includes a memory 140 (e.g., a hard drive, flash memory, memory card, system memory, or random access memory (RAM) for the mobile device) that stores content and other data (e.g., processing instructions or configuration settings), processors 145 (e.g., a central processing unit (CPU) and a graphics processing unit (GPU)) for executing processing instructions in order to implement the various features and functionality disclosed herein, and a BLUETOOTH component 180 or other network communication component 185 that implements a short-range communication protocol. To allow a user to make use of the various services of the mobile device 130, the mobile device includes a display 150, a keypad, touchpad, or touchscreen 155, a microphone 160, and a speaker 165.

In addition, the mobile device includes a policy document management module 170 and policy handler module 175. Policy document management module 170 is a software component responsible for creating, modifying, and managing a policy document 190 that reflects policies set forth by the telecommunications service provider or the mobile device user. For example, policy document management module 175 may be used to create an initial policy document containing policies from the telecommunications service provider, such as a policy requiring the mobile device to connect to an available WiFi network rather than an available 3G network when the mobile user is browsing Web pages. Once the policy document management module creates the initial policy document, the policy document management module may process subsequent changes to the policy document. For example, if the telecommunications service provider (or the user, if allowed) subsequently changes the policy to require that the mobile device must connect to an available 3G network rather than an available WiFi network when the mobile user is browsing Web pages, then the policy document management module may update the initial policy document to reflect the changed policy.

Policy handler module 175 is a software component responsible for parsing policy document 190 to extract policies, monitoring the current bearer and the available bearers, determining whether a change of bearer is warranted, and, if warranted, changing the mobile device bearer from a current bearer to a new bearer. For example, the policy handler module may extract a policy requiring the mobile device to connect to a WiFi network when browsing Web pages. The policy handler may then determine that the mobile device is currently connected to a 3G network and that a WiFi network (that previously was unavailable) is now available. In accordance with the extracted rule, the current bearer, and the available bearer, the policy handler may determine that a switch from the 3G network to the WiFi network is warranted. Upon such a determination, the policy handler may switch the bearer on the mobile device from the 3G network to the WiFi network.

To enable communication with multiple bearers, the mobile device may include an IP for Multimedia System (IMS) client with an IMS Stack 195. The IMS is an architectural framework for delivering Internet Protocol ("IP") multimedia to users of mobile devices. An IMS core network ("IMS core") permits wireless and wireline devices to access multimedia, messaging, and voice applications and services. IMS standards and specifications have been promulgated by the 3rd Generation Partnership Project ("3GPP"™) Session Initiation Protocol ("SIP") is a signaling protocol used for creating, modifying and terminating two-party or multiparty sessions consisting of one or several media streams. A mobile device registers its IP address with a SIP registrar server within an IMS core by generating and sending a SIP request message with a "REGISTER" method token. Once registered, a mobile device may subsequently establish multimedia sessions via the IMS core. An IMS stack software component on a mobile device allows one or more applications on the mobile device to register for various application services that are available on the IMS network.

The policies described above may be set forth in a policy document 190 that resides on the mobile device 130. FIG. 2 is a diagram depicting a sample policy document 190 implemented in extensible markup language (XML) format. The policy document contains a set of policies for the mobile device between <IMSRegistrationPolicy> open tag 205 and </IMSRegistrationPolicy> close tag 210. Between the IMSRegistrationPolicy open and close tags, policy document 200 sets policies governing how the mobile device should connect to five different service bearers: EDGE; GPRS; UMTS; HSPA; and IEEE 802.3 (WiFi).

At 215, the policy document sets forth policies pertaining to EDGE and GPRS networks, as indicated by the "EDGE, GPRS" value between the <NetworkType> open tag and the </NetworkType> close tag. A value of "ON" between the <MobileNetwork> open tag and the </MobileNetwork> close tag indicates that the mobile device must be attached to the mobile network in order to connect to the EDGE or GPRS network; a value of "OFF" would indicate the opposite. A value of "OFF" between the <IMSRegistration> open tag and the </IMSRegistration> close tag indicates that IMS registration is needed in order for the mobile device to connect to either the EDGE or GPRS network; a value of "ON" would indicate the opposite. A value of "04" between the <Priority> open tag and the </Priority> close tag indicates that the EDGE and GPRS networks are assigned the fourth highest priority when the mobile device must decide among bearers that are otherwise equally appropriate. A value of "Economy" between the <ServicePlan> open tag and the </ServicePlan> close tag indicates that the EDGE and GPRS networks are available when the user of the mobile device selects an economy (i.e., a lower tier) service plan. A value of "OFF" between the <CongestionAvoid> open tag and the </CongestionAvoid> close tag indicates that the mobile device should not avoid connecting to the EDGE or GPRS networks when those networks are congested with traffic from multiple other users; a value of "ON" would indicate the opposite. A value of "TEXT, PHONE, EMAIL" between the <UserApplication> open tag and the </UserApplication> close tag indicates that the EDGE and GPRS networks are available when the user of the mobile device desires to take advantage of text messaging, telephony phone calls, and sending and receiving e-mail. A value of "OFF" between the <UserModify> open tag and the </UserModify> close tag indicates that the user may not make changes to the policy document with respect to EDGE and GPRS networks; a value of "ON" would indicate the opposite.

At 220, the policy document sets forth policies pertaining to UMTS networks, as indicated by the "UMTS" value between the <NetworkType> open tag and the </NetworkType> close tag. A value of "ON" between the <MobileNetwork> open tag and the </MobileNetwork> close tag indicates that the mobile device must be attached to the mobile network in order to connect to a UMTS network; a value of "OFF" would indicate the opposite. A value of "ON" between the <IMSRegistration> open tag and the </IMSRegistration> close tag indicates that IMS registration is not needed in order for the mobile device to connect to UMTS networks; a value of "OFF" would indicate the opposite. A value of "+g.3gpp.smsip" between the <Service> open tag and the </Service> close tag indicates that the "+g.3gpp.smsip" feature tag may be registered when connecting to a UMTS network. A value of "03" between the <Priority> open tag and the </Priority> close tag indicates that UMTS networks are assigned the third highest priority when the mobile device must decide among bearers that are otherwise equally appropriate. A value of "Economy, Standard" between the <ServicePlan> open tag and the </ServicePlan> close tag indicates that UMTS networks are available when the user of the mobile device selects either an economy (i.e., a lower tier) service plan or a standard (i.e., a middle tier) service plan. A value of "OFF" between the <CongestionAvoid> open tag and the </CongestionAvoid> close tag indicates that the mobile device should not avoid connecting to UMTS networks when those networks are congested with traffic from multiple other users; a value of "ON" would indicate the opposite. A value of "TEXT, PHONE, EMAIL" between the <UserApplication> open tag and the </UserApplication> close tag indicates that UMTS networks are available when the user of the mobile device desires to take advantage of text messaging, telephony phone calls, and sending and receiving e-mail. A value of "OFF" between the <UserModify> open tag and the </UserModify> close tag indicates that the user may not make changes to the policy document with respect to UMTS networks; a value of "ON" would indicate the opposite.

At 225, the policy document sets forth policies pertaining to High Speed Packet Access (HSPA) networks, as indicated by the "HSPA" value between the <NetworkType> open tag and the </NetworkType> close tag. A value of "ON" between the <MobileNetwork> open tag and the </MobileNetwork> close tag indicates that the mobile device must be attached to the mobile network in order to connect to an HSPA network; a value of "OFF" would indicate the opposite. A value of "ON" between the <IMSRegistration> open tag and the </IMSRegistration> close tag indicates that IMS registration is not needed in order for the mobile device to connect to HSPA networks; a value of "OFF" would indicate the opposite. A value of "+g.3gpp.smsip" between the <Service> open tag and the </Service> close tag indicates that the "+g.3gpp.smsip" feature tag may be registered when connecting to an HSPA network. A value of "02" between the <Priority> open tag and the </Priority> close tag indicates that HSPA networks are assigned the second highest priority when the mobile device must decide among bearers that are otherwise equally appropriate. A value of "Economy, Standard, Premium" between the <ServicePlan> open tag and the </ServicePlan> close tag indicates that HSPA networks are available when the user of the mobile device selects an economy (i.e., a lower tier) service plan, a standard (i.e., a middle tier) service plan, or a premium (i.e., upper tier) service plan. A value of "ON" between the <CongestionAvoid> open tag and the </CongestionAvoid> close tag indicates that the mobile device should avoid connecting to HSPA networks when those networks are congested with traffic from multiple other users; a value of "OFF" would indicate the opposite. A value of "TEXT, PHONE, VIDEOCHAT, EMAIL" between the <UserApplication> open tag and the </UserApplication> close tag indicates that HSPA networks are available when the user of the mobile device desires to take advantage of text messaging, telephony phone calls, video chatting, and sending and receiving e-mail. A value of "OFF" between the <UserModify> open tag and the </UserModify> close tag indicates that the user may not make changes to the policy document with respect to HSPA networks; a value of "ON" would indicate the opposite.

At 230, the policy document sets forth policies pertaining to IEEE 802.3 (or "WiFi") networks, as indicated by the "IEEE-802.3" value between the <NetworkType> open tag and the </NetworkType> close tag. A value of "OFF" between the <MobileNetwork> open tag and the </MobileNetwork> close tag indicates that the mobile device is not required to be attached to the mobile network in order to connect to a WiFi network; a value of "ON" would indicate the opposite. A value of "ON" between the <IMSRegistration> open tag and the </IMSRegistration> close tag indicates that IMS registration is not needed in order for the mobile device to connect to WiFi networks; a value of "OFF" would indicate the opposite. A value of "+g.3gpp.smsip" between the first <Service> open tag and the first </Service> close tag indicates that the "+g.3gpp.smsip" feature tag may be registered when connecting to a WiFi network. A value of "urn-7:3gpp-service.ims.icsi.mmtel" between the second <Service> open tag and the second </Service> close tag indicates that the "urn-7:3gpp-service.ims.icsi.mmtel" feature tag may be registered when connecting to a WiFi network. A value of "01" between the <Priority> open tag and the </Priority> close tag indicates that WiFi networks are assigned the highest priority when the mobile device must decide among bearers that are otherwise equally appropriate. A value of "Economy, Standard, Premium" between the <ServicePlan> open tag and the </ServicePlan> close tag indicates that WiFi networks are available when the user of the mobile device selects an economy (i.e., a lower tier) service plan, a standard (i.e., a middle tier) service plan, or a premium (i.e., upper tier) service plan. A value of "OFF" between the <CongestionAvoid> open tag and the </CongestionAvoid> close tag indicates that the mobile device should not avoid connecting to WiFi networks when those networks are congested with traffic from multiple other users; a value of "ON" would indicate the opposite. A value of "TEXT, PHONE, VIDEOCHAT, EMAIL" between the <UserApplication> open tag and the </UserApplication> close tag indicates that WiFi networks are available when the user of the mobile device desires to take advantage of text messaging, telephony phone calls, video chatting, and sending and receiving e-mail. A value of "ON" between the <UserModify> open tag and the </UserModify> close tag indicates that the user may make changes to the policy document with respect to WiFi networks; a value of "OFF" would indicate the opposite.

A person of ordinary skill in the art will appreciate that, while certain parameters (such as NetworkType, MobileNetwork, IMSRegistration, Service, ServicePlan, CongestionAvoid, and UserApplication) are specified via text strings, these parameters may alternatively be specified numerically. A person of ordinary skill in the art will further appreciate that, while certain parameters (such as Priority) are specified numerically, the certain parameters may alternatively be specified via text strings. A person of ordinary skill in the art will further appreciate that the policy document may be configured to grant or deny permission for a user to modify all parameters associated with a given network type, or the policy document may be configured to grant or deny permission for a user to modify only a subset of the parameters associated with a given network type. While policy document 200 is implemented as an XML document, a person of ordinary skill in the art will appreciate that the policy document may be implemented in a variety of different formats.

Figure 3A:
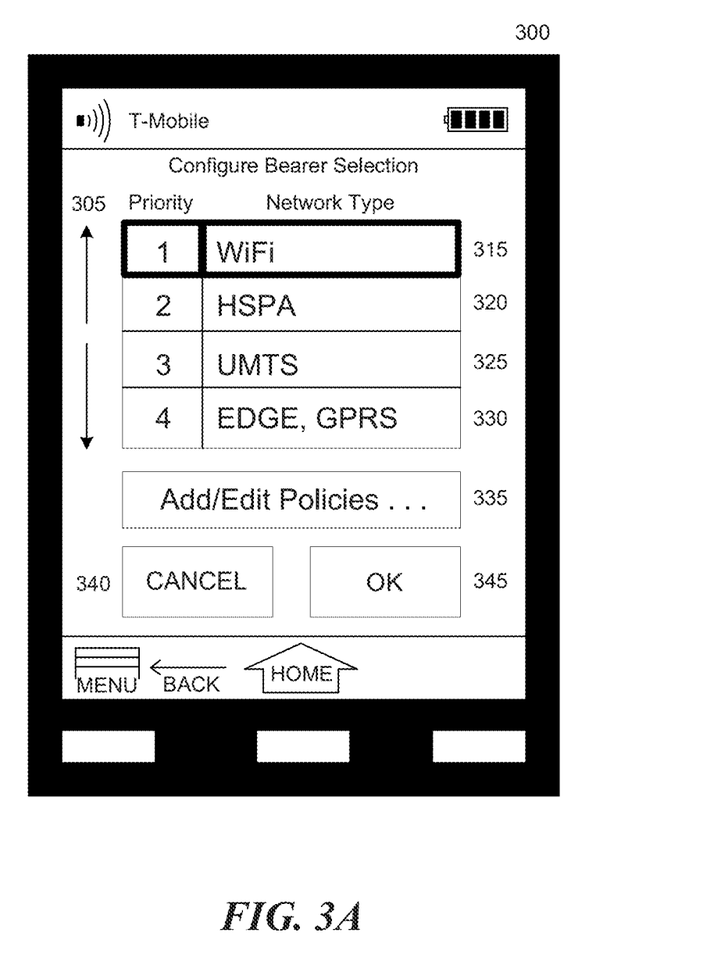
FIGS. 3A and 3B are representative user interfaces on a mobile device for specifying user-initiated changes to a policy document.
Figure 3B:
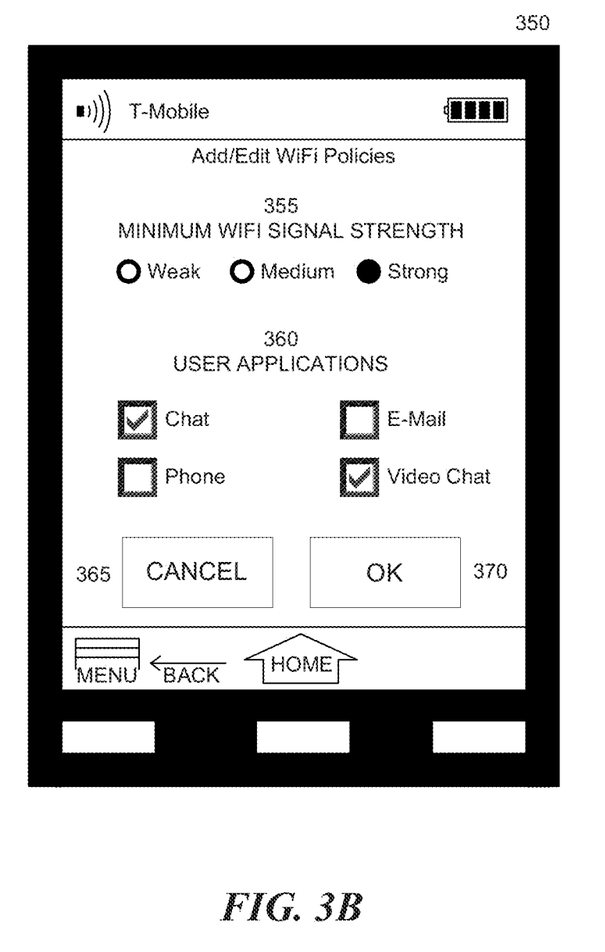

Although the policy document is initially configured by the service provider, the user of the mobile device may make subsequent changes to the policy document if allowed by the service provider. FIGS. 3A and 3B are representative user interfaces on the mobile device for specifying user-initiated changes to the policy document. In FIG. 3A, the user may invoke interface 300 on the mobile device in order to make changes to the policy document. The user interface displays each bearer type for which the user may modify policy settings. For example, the user may be able to modify policies for WiFi networks (315), HSPA networks (320), UMTS networks (325) and EDGE/GPRS networks (330). The user may set the priority of each bearer (as indicated in the "priority column") by selecting up and down arrows 305 to either increase or decrease the priority of the selected bearer. After setting bearer priority, the user may select "OK" icon 345 to submit the requested changes, or the user may select "CANCEL" icon 340 to disregard the changes.

In addition to setting the priority, the user may set more detailed policies for each bearer. For example, the user may select WiFi network 315 and then select the "Add/Edit Policies . . . " icon 335. The mobile device then presents interface 350 of FIG. 3B, where the user may set additional policies pertaining specifically to WiFi networks. At 355, the user may set a policy regarding the minimum required signal strength (i.e., weak, medium, or strong) in order for the mobile device to connect to a WiFi network. For example, by selecting the "Strong" option, the user may indicate that the mobile device should join only those WiFi networks for which the signal is strong. In other words, by selecting the "Strong" option, the user sets a policy that the mobile device should avoid connecting to WiFi networks for which the signal is weak or moderate. Accordingly, the user may be able to avoid joining a WiFi network with a slow speed that would result in poor performance for data intensive activities, such as streaming video footage. At 360, the user may specify whether WiFi networks should be selected when the user desires to take advantage of certain activities, such as text chat, e-mail, video chat, or phone calls. For example, by placing a checkmark next to "Chat" and "Video Chat," the user specifies a desire to join a WiFi network if the user is engaged in chat or video chat activities. Conversely, by omitting a check mark next to "E-mail" and "Phone," the user specifies that it is not necessary for the mobile device to join a WiFi network if the user is engaged in only e-mail or phone activity. A person of ordinary skill in the art will appreciate that the mobile device interface may present the user with additional options for specifying policies for bearer selection. A person of ordinary skill in the art will further appreciate that policy options that are selectable by the service provider only may not be displayed to the user for modification, or may be displayed with to the user with an indication (such as strike-through or grey text) that the respective option may not be changed by the user.

When the user has completed policy settings, the user may either disregard the policy changes by selecting "Cancel" icon 365, or the user may submit the policy changes by selecting "OK" icon 370. In some embodiments, the mobile device provides an indication to the user if the user submitted a policy change that conflicts with a policy set forth by the service provider. The indication may take a variety of different forms, including visual, audible, or haptic forms. After presenting the indication, the user interface may either submit none of the requested policy changes, or the user interface may submit only the requested policy changes that do not conflict with the service provider policies. In some embodiments, the user interface may either submit none of the requested policy changes and provide no such indication to the mobile device user, or the user interface may submit only the requested policy changes that do not conflict with the service provider policies and provide no such indication to the mobile device user.

Figure 4:
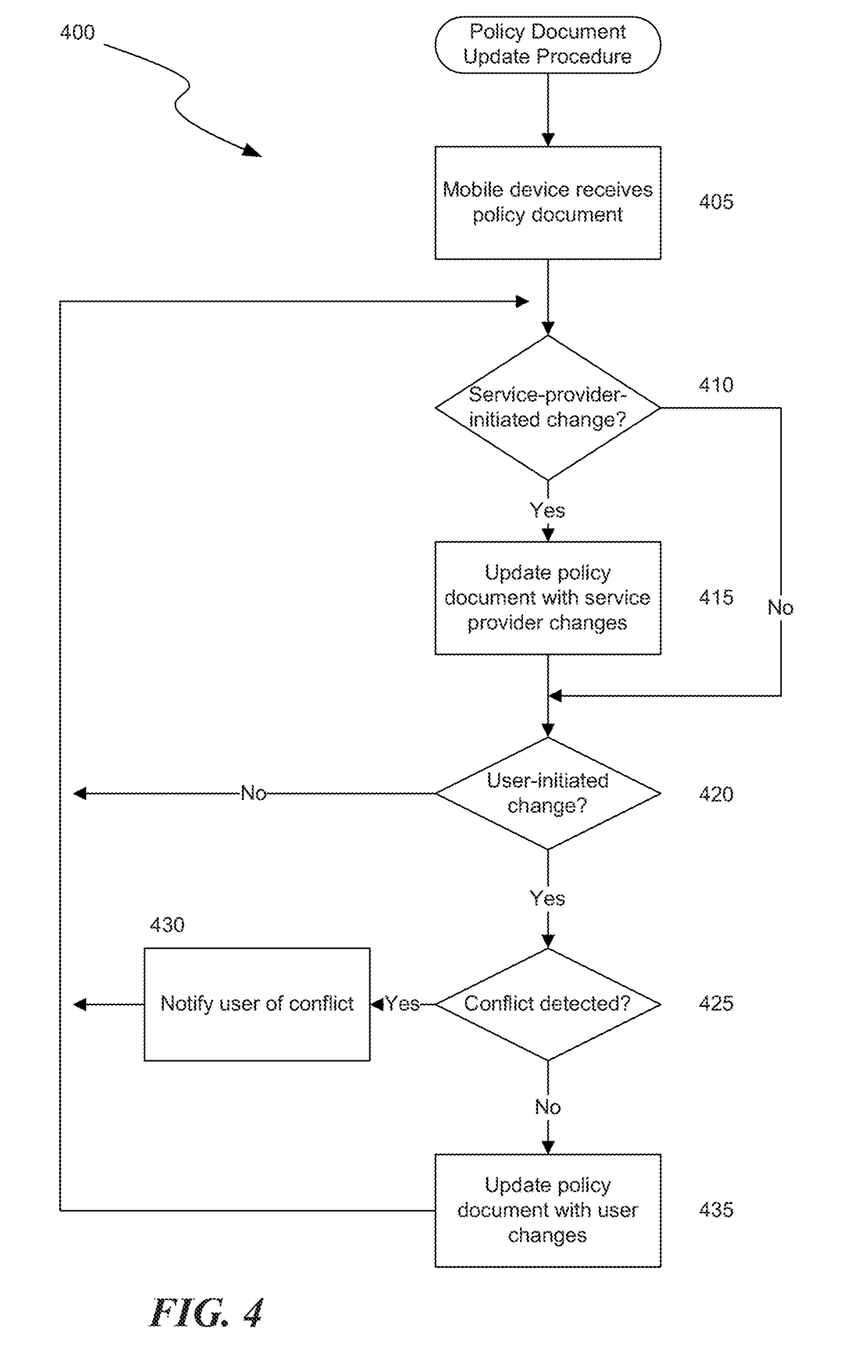
FIG. 4 is a flow chart of a process for updating a policy document.

FIG. 4 is a flow chart of a process for updating a policy document. At step 405, the mobile device receives an initial copy of the policy document. The service provider or the manufacturer may provide the initial policy document to the mobile device before the device is provisioned on the service provider network. At step 410, the mobile device checks for a service-provider-initiated change to the policy document. If the mobile device detects a service-provider-initiated policy document change, the policy document is modified at 415 to incorporate the changes from the service provider. If the mobile device does not detect a service-provider-initiated policy document change, the system at block 420 checks for a user-initiated change to the policy document. If the system does not detect a user-initiated change, the system returns to block 410, where it again checks for a service-provider-initiated change. If the system does detect a user-initiated change, the system at 425 checks for conflicts between the user-initiated change and the policies set forth by the service provider. If the system detects a conflict, the system does not process the conflicting user-initiated changes. Instead, the system at 430 notifies the user of the conflict and returns to block 410 to monitor for service provider initiated changes. If the system does not detect a conflict, the system at 435 modifies the policy document on the mobile device and returns to block 410 to monitor for service-provider-initiated changes.

Figure 5:
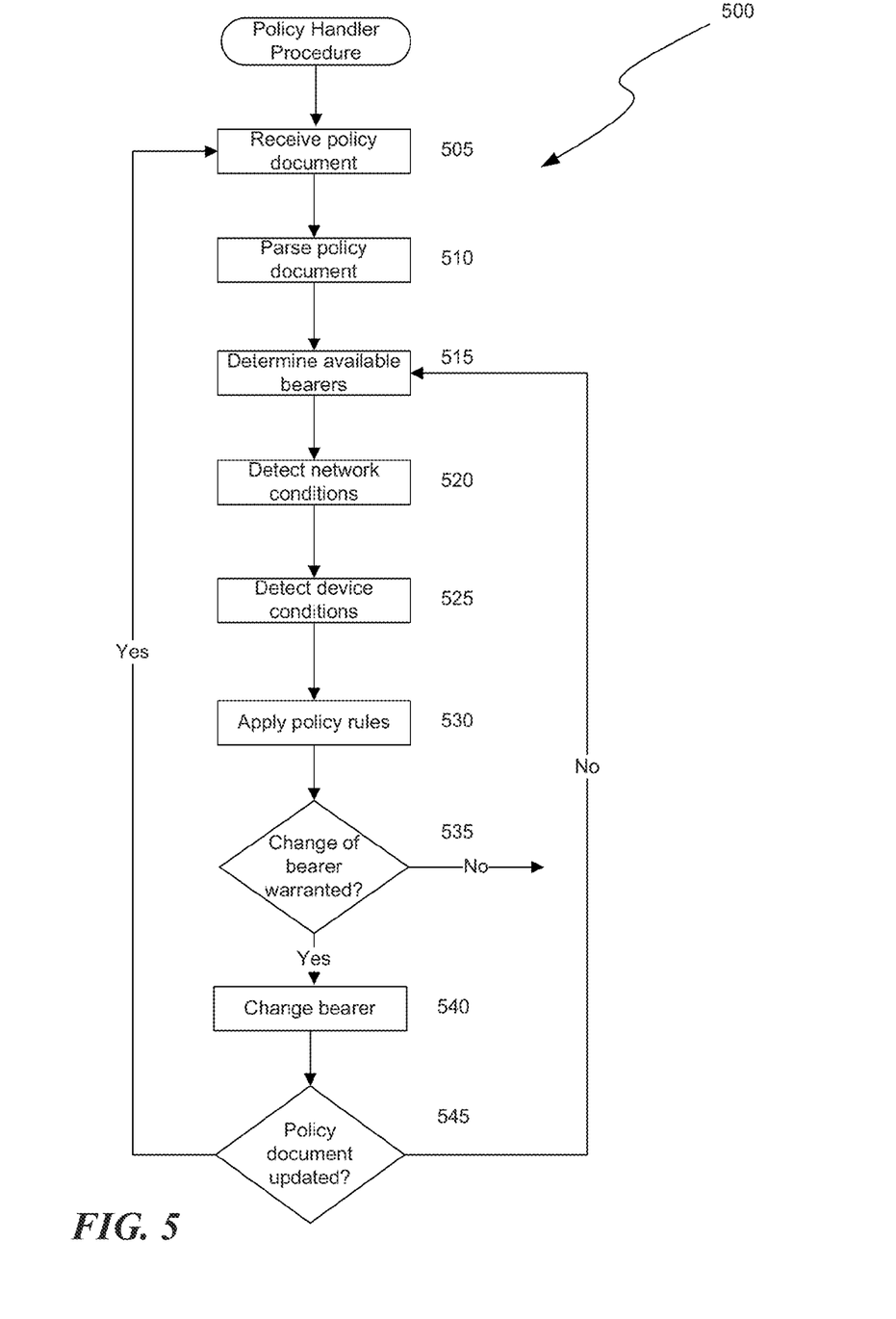
FIG. 5 is a flow chart of a process by which a policy handler selects an appropriate bearer according to the policies set forth in the policy document.

FIG. 5 is a flow chart of a process by which a policy handler selects an appropriate bearer according to the policies set forth in the policy document. At 505, the policy handler receives the policy document. The policy handler then parses the policy document at 510 to extract individual policies for the various bearers. After parsing the policy document, the policy handler at 515 examines the current network environment to determine the available bearers to which the mobile device may connect. At step 520, the policy handler determines the conditions of the available networks. For example, the policy handler may determine whether a 3G network is congested with user traffic, or the policy handler may determine whether a WiFi network has a weak, moderate, or strong signal. After detecting network conditions, the policy handler at 525 detects various conditions of the mobile device itself. For example, the policy handler may detect which features the user is currently taking advantage of, including phone calls, text messages, e-mail, or video chats. At step 530, the policy handler takes into account various factors, including network conditions, mobile device conditions, and the policies set forth in the policy document in order to determine whether a change in bearer is warranted. If a change in bearer is warranted, the policy handler at 540 selects the new bearer. If a change in bearer is not warranted, the policy handler returns to block 515 to again monitor available bearers. At block 545, the policy handler checks for updates to the policy document. If the policy handler detects a change to the policy document, the policy handler returns to block 505 to retrieve the updated policy document and determine whether a change in bearer is now warranted. If the policy handler does not detect a change to the policy document, the policy handler returns to block 515 to again monitor the available bearers.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method in a mobile device for updating a policy document to reflect changes to one or more policies for selecting an appropriate service bearer to carry mobile device traffic, comprising:

receiving, on the mobile device, a policy document that is provided by a service provider,
   wherein the policy document contains one or more policies for selecting an appropriate service bearer to carry mobile device traffic;
receiving, on the mobile device, one or more updates to the policy document, wherein the one or more updates are user-initiated or service-provider-initiated;
determining whether each update to the policy document is user-initiated or service-provider-initiated;
for one or more updates that are determined to be service-provider-initiated, modifying the policy document to reflect the service-provider-initiated updates; and
for one or more updates that are determined to be user-initiated:
   determining whether a user-initiated update is permitted by the service provider;
   for one or more user-initiated updates that are determined to be permitted by the service provider, modifying the policy document to reflect the user-initiated update; and
   for one or more user-initiated updates that are determined not to be permitted by the service provider, disregarding the user-initiated update.

2. The method of claim 1, further comprising providing an indication that the updates have been disregarded on the mobile device.

3. The method of claim 2 wherein the indication includes a visual indication on a mobile device screen.

4. The method of claim 2 wherein the indication includes a haptic indication on the mobile device.

5. The method of claim 3 wherein disregarding the user-initiated updates further includes disregarding only the user-initiated updates that conflict with one or more policies set forth by the service provider and modifying the policy document to reflect one or more user-initiated updates that do not conflict with policies set forth by the service provider.

6. The method of claim 1 wherein the user-initiated update is not permitted by the service provider if the user-initiated update conflicts with a service-provider policy included in the policy document that is not subject to modification by users.

7. The method of claim 1, further comprising receiving, on the mobile device, a request from the service provider for a list of user-initiated updates made to the policy document.

8. The method of claim 1, further comprising receiving, on the mobile device, service-provider-initiated updates responsive to the user-initiated updates.

9. The method of claim 1, further comprising receiving, on the mobile device, service-provider-initiated updates on a periodic basis.

10. The method of claim 1 wherein the policy document includes, for each of one or more service bearers, policies associated with IMS registration, network type, network congestion, priority, service plan, applications, and permissibility of user-initiated updates.

11. The method of claim 1 wherein the appropriate service bearer is one of WiFi, ultra-wideband, ZIGBEE, infrared, Global System for Mobile (GSM), Third Generation mobile telecommunications network (3G), Fourth Generation mobile telecommunications network (4G), General Packet Radio Service (GPRS), Enhanced General Packet Radio Service (EGPRS), Enhanced Data rates for GSM Evolution (EDGE), Universal Mobile Telecommunications System (UMTS), and Long Term Evolution (LTE).

12. A non-transitory computer-readable storage medium comprising instructions for automatically selecting an appropriate service bearer to carry mobile device traffic, the instructions, when executed by a processor, cause the processor to:
   receive, on the mobile device, a policy document containing one or more policies for selecting an appropriate service bearer to carry mobile device traffic;
   parse, on the mobile device, the received policy document to extract one or more policies related to appropriate bearer selection;
   detect, on the mobile device, the availability of one or more service bearers capable of carrying mobile traffic;
   determine the appropriate bearer to carry the mobile device traffic, wherein the determination is based at least in part on the one or more policies extracted from the policy document and the detected availability of the one or more service bearers; and
   if the determined appropriate service bearer is different from a current service bearer, switch the mobile device from the current service bearer to the determined appropriate service bearer.

13. The non-transitory computer-readable storage medium of claim 12, further comprising instructions that, when executed by a processor, cause the processor to detect a congestion level of at least one of the one or more service bearers and determine the appropriate service bearer based at least in part on the one or more detected congestion levels.

14. The non-transitory computer-readable storage medium of claim 12 wherein switching the mobile device from the current service bearer to the determined appropriate service bearer further causes the processor to provide an indication of the service bearer switch on the mobile device.

15. The non-transitory computer-readable storage medium of claim 12 wherein the indication of the bearer switch is a visual indication on a mobile device screen or a haptic indication on the mobile device.

16. The non-transitory computer-readable storage medium of claim 12, further comprising instructions that, when executed by a processor, cause the processor to repeat at least the parsing, the detecting, and the determining responsive to receiving an update to at least one policy of the policy document.

17. The non-transitory computer-readable storage medium of claim 12 wherein the appropriate service bearer is one of WiFi, ultra-wideband, ZIGBEE, infrared, Global System for Mobile (GSM), Third Generation mobile telecommunications network (3G), Fourth Generation mobile telecommunications network (4G), General Packet Radio Service (GPRS), Enhanced General Packet Radio Service (EGPRS), Enhanced Data rates for GSM Evolution (EDGE), Universal Mobile Telecommunications System (UMTS), and Long Term Evolution (LTE).

18. A computing system that updates a policy document to reflect changes to one or more policies for selecting an appropriate service bearer to carry mobile device traffic, the computing system comprising:
   a memory storing computer-executable instructions of:
      a policy document management component configured to receive a policy document containing one or more policies for selecting an appropriate service bearer to carry mobile device traffic; and
      a policy handler component configured to:
         parse the received policy document to extract one or more policies related to appropriate bearer selection;
         detect the availability of one or more service bearers capable of carrying mobile traffic;
         determine the appropriate bearer to carry the mobile device traffic, wherein the determination is based at least in part on the one or more policies extracted from the policy document and the detected availability of the one or more service bearers; and
         if the determined appropriate service bearer is different from a current service bearer, switch the mobile device from the current service bearer to the determined appropriate service bearer; and
   a processor for executing the computer-executable instructions stored in the memory.

19. The computing system of claim 18, further comprising an IP for Multimedia System (IMS) stack utilized in communicating with at least one of the service bearers.

20. The computing system of claim 18 wherein at least one of the policy document and policy handler are compatible with the Android® platform.

* * * * *